United States Patent [19]
Ohga

[11] Patent Number: 5,233,344
[45] Date of Patent: Aug. 3, 1993

[54] INDIVIDUAL SELECTIVE CALL RECEIVING APPARATUS

[75] Inventor: Tadashi Ohga, Yokohama, Japan

[73] Assignee: Matsushita Electric Industrial Co., Ltd., Kadoma, Japan

[21] Appl. No.: 796,815

[22] Filed: Nov. 25, 1991

[30] Foreign Application Priority Data

Nov. 29, 1990 [JP] Japan ................................ 2-333875

[51] Int. Cl.$^5$ .............................................. H04B 7/00
[52] U.S. Cl. ............................ 340/825.44; 340/311.1; 455/38.3
[58] Field of Search ...................... 340/825.44, 825.47, 340/825.48, 311.1; 455/343, 38.1, 38.3

[56] References Cited

U.S. PATENT DOCUMENTS 4,996,526 2/1991 DeLuce .......................... 340/825.48

OTHER PUBLICATIONS

"The book of the CCIR Radiopaging Code No. 1"; (Radiopaging Code Standards Group; 1986).

Primary Examiner—Donald J. Yusko
Assistant Examiner—Dervis Magistre
Attorney, Agent, or Firm—Spencer, Frank & Schneider

[57] ABSTRACT

An individual selective call receiving device including a receiver unit has an intermittent receiving unit for intermittently operating the receiver unit in association with a group of a calling number assigned to the device. A collating unit sequentially collates a received synchronizing code sequence with a code sequence of a predetermined synchronizing code pattern, and sequentially collates a received selective calling code sequence with a code sequence of a predetermined selecting calling code pattern. A counter sequentially counts a number of error bits resultant from each of the collations. An intermittent operation control unit controls the intermittent receiving unit when a numeric value counted by the counter becomes equal to a preset threshold value, thereby turning the power of the receiver unit off.

11 Claims, 7 Drawing Sheets

| 1 | 2 | 19 | 20 21 | 22 | 31 | 32 |
|---|---|---|---|---|---|---|
| F | SELECTIVE CALL NUMBER (18 BITS) | | FUNC-TION | BCH PARITY | | PARITY |

INDIVIDUAL SELECTIVE CALL RECEIVING APPARATUS

BACKGROUND OF THE INVENTION

The present invention relates to an individual selective call receiving apparatus achieving an intermittent receiving operation.

Conventionally, there have been utilized individual selective call receiving apparatuses handling various kinds of signal formats. FIG. 1 shows a representative signal format which is applied to the individual selective call receiving apparatuses in the conventional technology and which has been described in an article "The book of the CCIR Radiopaging Code No. 1" (Radiopaging Code Standards Group; 1986).

In FIG. 1, a transmission code is constituted with a preamble (repeatedly including "1" and "0") and a plurality of batches (first and second batches) following the preamble. The first batch includes a one-word (32 bits) synchronizing code word (SC) and an 8-frame (16 words) selective calling or call code. Accordingly, the respective selective call receiving apparatuses are classified into eight groups such that the receiving apparatuses of a group achieve a receiving operation only for a selective calling code of a frame beforehand assigned thereto.

In order to efficiently receive the code in the format above, the selective call receiving apparatus conducts an intermittent receiving operation.

FIG. 2 shows the configuration of a conventional intermittent receiving apparatus. FIG. 2 includes a bit synchronization unit 701 for detecting a change point of received data represented in the non-return-to-zero (NRZ) code system to generate a clock signal corresponding to the transmission speed, a frame synchronization unit 702 for detecting a synchronizing signal in the received NRZ data to produce a signal associated with an intermediate operation, and an intermediate operation unit 703. In operation, NRZ data is supplied to the bit synchronization unit 701 and the frame synchronization unit 702. The bit synchronization unit 701 then detects a change point of the received data to output the clock associated with the transmission speed to the frame synchronization unit 702.

As a result, the frame synchronization unit 702 detects a frame synchronizing signal in the received NRZ data to output an intermittent operation signal to the intermittent operation unit 703, thereby delivering the signal to the receiver unit through an intermittent operation of the intermittent operation unit 703. Namely, while establishing a synchronization with the transmission signal, the apparatus controls the receiver unit.

On the other hand, during a frame synchronization, each selective call receiving apparatus receives a calling code of a frame (own frame) beforehand assigned thereto and then achieves the collation of the individual calling number (identification or identifier collation).

Subsequently, the conventional method of identifier collation will be described. FIG. 3 is a diagram showing the selective calling code format. A selective calling code includes 32 bits as shown in FIG. 3, namely, bit 1 is an address/message flag, bits 2 to 19 denote a selective calling number, bits 20 and 21 are function bits (specifying a calling tone or sound pattern), bits 22 to 31 are Bose-Chaudhuri-Hocquenghem (31, 32) parity bits, and bit 32 is an even parity.

In the code system of this type, the distance d between codes is six (d=6) and hence a 3-bit error correction is theoretically possible in the collation of the fixed pattern, for example, in the identifier collation. However, ordinarily, a 1-bit or 2-bit error correction is adopted to avoid a risk of an erroneous collation between the identifiers.

Next, the identifier collation method will be specifically described. FIG. 4 shows an example of a conventional ID collating apparatus. In FIG. 4, the configuration includes a number ROM 901 loaded with a selective call number, an BCH generator unit 902 for generating a 32-bit BCH code for the selective call number written in the number ROM 901, a shift register 903 for storing therein the 32-bit code created by the BCH generator 902, a shift register 904 for storing therein received data, a shift register 905 disposed to conduct an identifier collation for the data loaded in the shift register 904, an exclusive OR gate 906 for achieving an exclusive OR between outputs from the shift registers 903 and 905, and a counter 907 for counting signals outputted from the exclusive OR gate 906.

A description will now be given of the operation of the identifier collating apparatus of the prior art. First, a reset signal RES is inputted to the counter 907 to reset the counter 907.

Next, received data (in the NRZ code system) is stored in the shift register 904 in response to a clock CLK1 supplied from the bit synchronization unit 701 shown in FIG. 2.

When the 32-bit data is completedly loaded in the shift register 904, a data transfer takes place to move the data from the shift register 904 to the shift register 905.

Moreover, a code series or sequence produced by the BCH generator 902 depending on the selective call signal loaded in the number ROM 901 is transferred to the shift register. In the situation where the shift registers 903 and 905 are thus loaded with the data, when a clock CLK2 having a higher speed than the clock CLK1 is inputted to the shift registers 903 and 905, the identifier collation is accomplished.

Namely, in response to the clock CLK2, data are respectively read from the shift registers 903 and 905 such that these output items are compared by the exclusive OR gate 906. Resultant signals of the comparison are counted by the counter 907.

In this case, when 32 clocks CLK2 are supplied to the counter 907, the value of the counter 907 is referenced. If a threshold value preset thereto is exceeded by the count value, an identifier collation mismatching is assumed; otherwise, an identifier collation matching results. The operation above is repeatedly carried out for four functions to thereby finish the identifier collation.

SUMMARY OF THE INVENTION

It is therefore an object of the present invention to provide an individual selective call receiving apparatus which minimizes the operation period of time of the receiver unit during the frame synchronization so as to advantageously elongate the life of the battery of the apparatus, thereby solving the problem of the prior art.

In order to achieve the object above, according to the present invention, there is provided an individual selective call receiving apparatus comprising a calling code collating unit for collating a selective call code assigned thereto and a received selective calling code and an intermittent operation controller for interrupting power supplied to a receiver unit when the calling code collating unit decides that a mismatching is found during a calling signal collation or that a mismatching of a synchronization code is detected during a synchronizing code collation.

The configuration above according to the present invention operates as follows. Namely, during an identifier collation in the calling code collating unit or during a synchronization code collation in a synchronizing code collating unit, when the collation fails or a mismatching results, the intermittent operation controller immediately interrupts power supplied to the receiver unit. This minimizes the operation time of the receiver unit during the frame synchronization and hence leads to an advantageous effect of elongation of a battery of the apparatus.

Moreover, in the synchronizing code collation, by beforehand storing a predetermined synchronizing code pattern in the shift register 903, the synchronizing code (SC) collation can also be accomplished through an operation similar to that achieved in the identifier collation.

As above, even in the conventional identifier collating apparatus or unit, the receiving operation can be carried out through the identifier collation.

However, in the identifier collating apparatus of the prior art, since the frequency of the calls actually received by the selective call receiving apparatus is several times to several tens of times per day, even in the frame synchronization state, the chance or probability of transmission of the selective calling code of the identifier collating apparatus is quite small. Namely, in most cases, selective calling codes of other apparatuses or empty codes are transmitted.

That is, the identifier collation results in a failure in most cases and hence the electric current flowing during the receiving operation in the identifier collation is wastefully consumed, leading to a disadvantage that the life of the battery is reduced.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
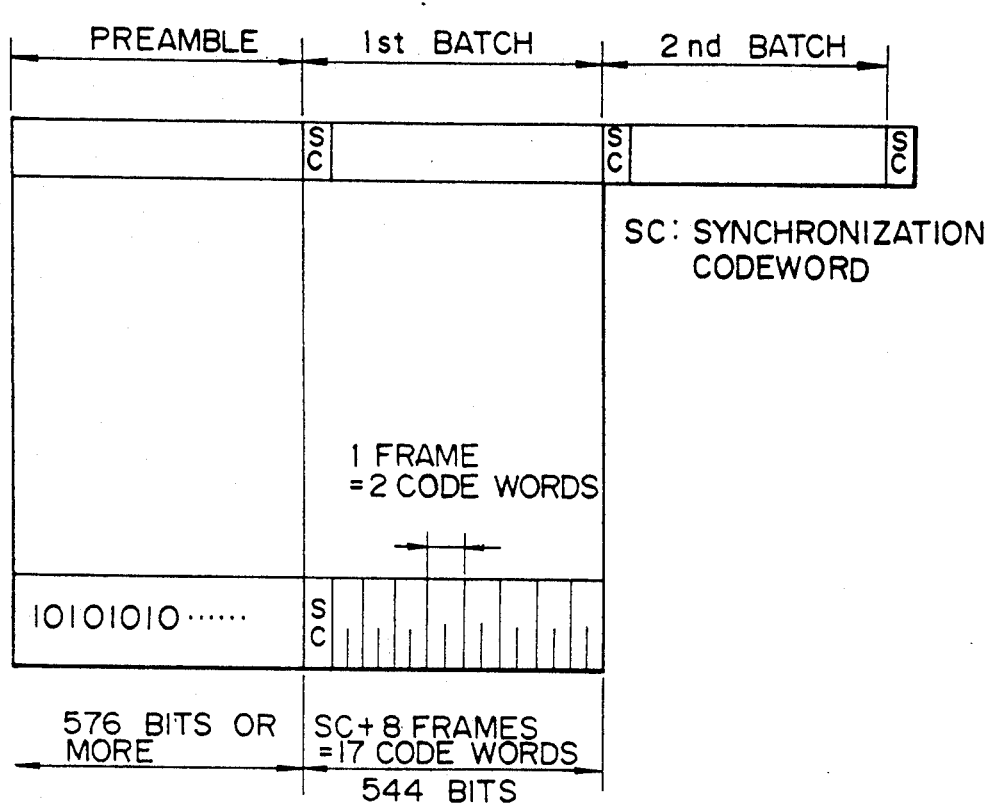
FIG. 1 is a diagram schematically showing the signal format used in an individual selective call receiving apparatus of the prior art.
Figure 2:
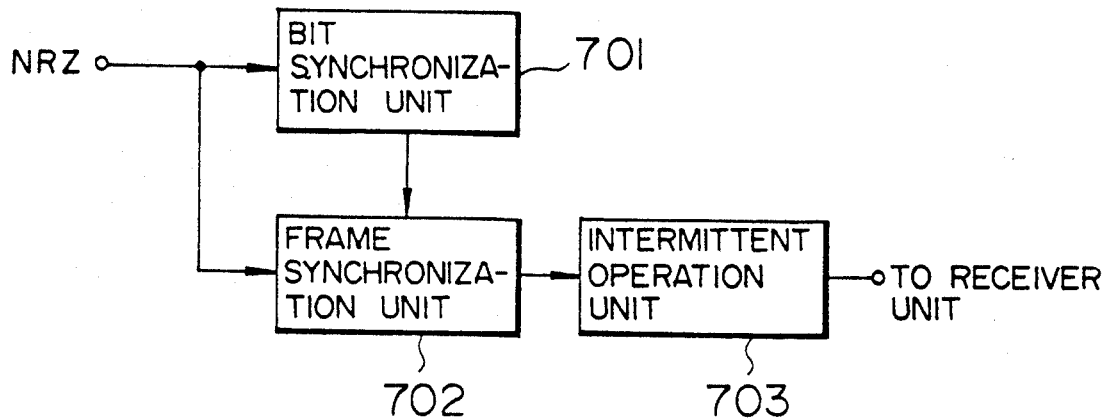
FIG. 2 is a schematic block diagram showing the configuration of a conventional intermittent receiving apparatus.
Figures 3, 4:
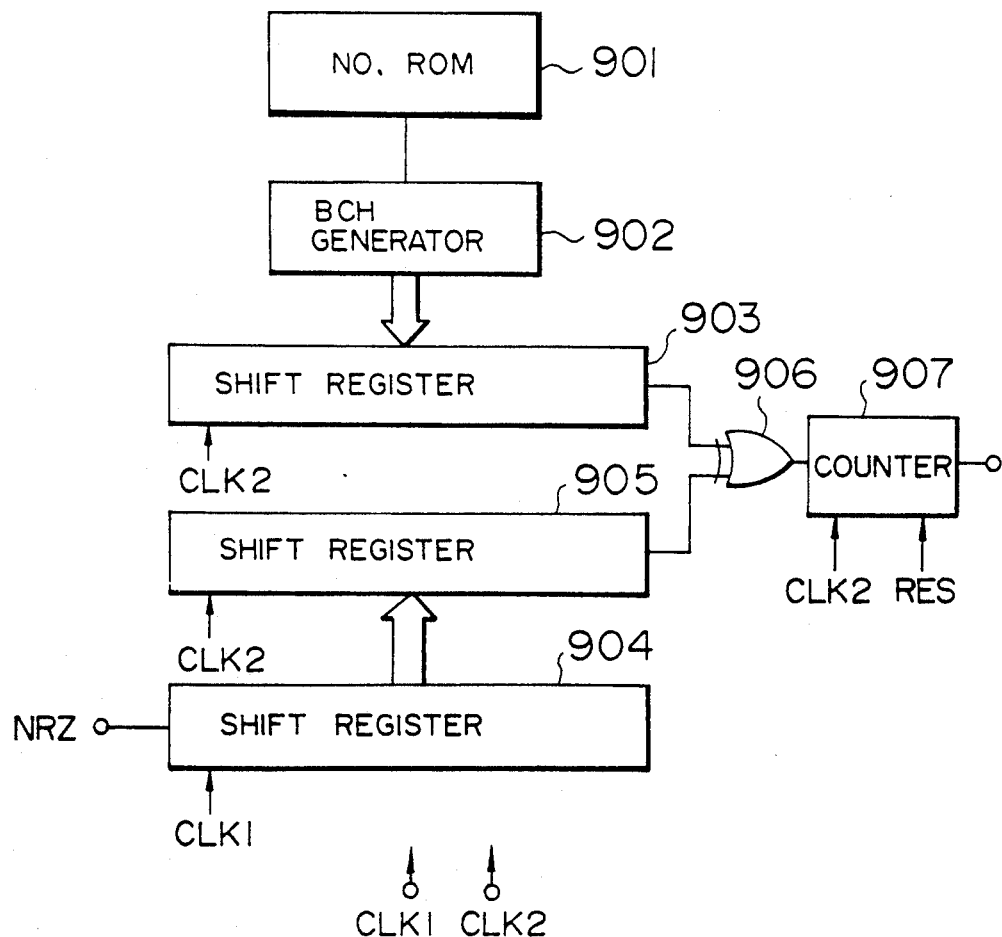
FIG. 3 is a diagram showing the format of the selective calling code.
FIG. 4 is a block diagram showing the primary sections of a conventional identifier collating apparatus.
Figure 5:
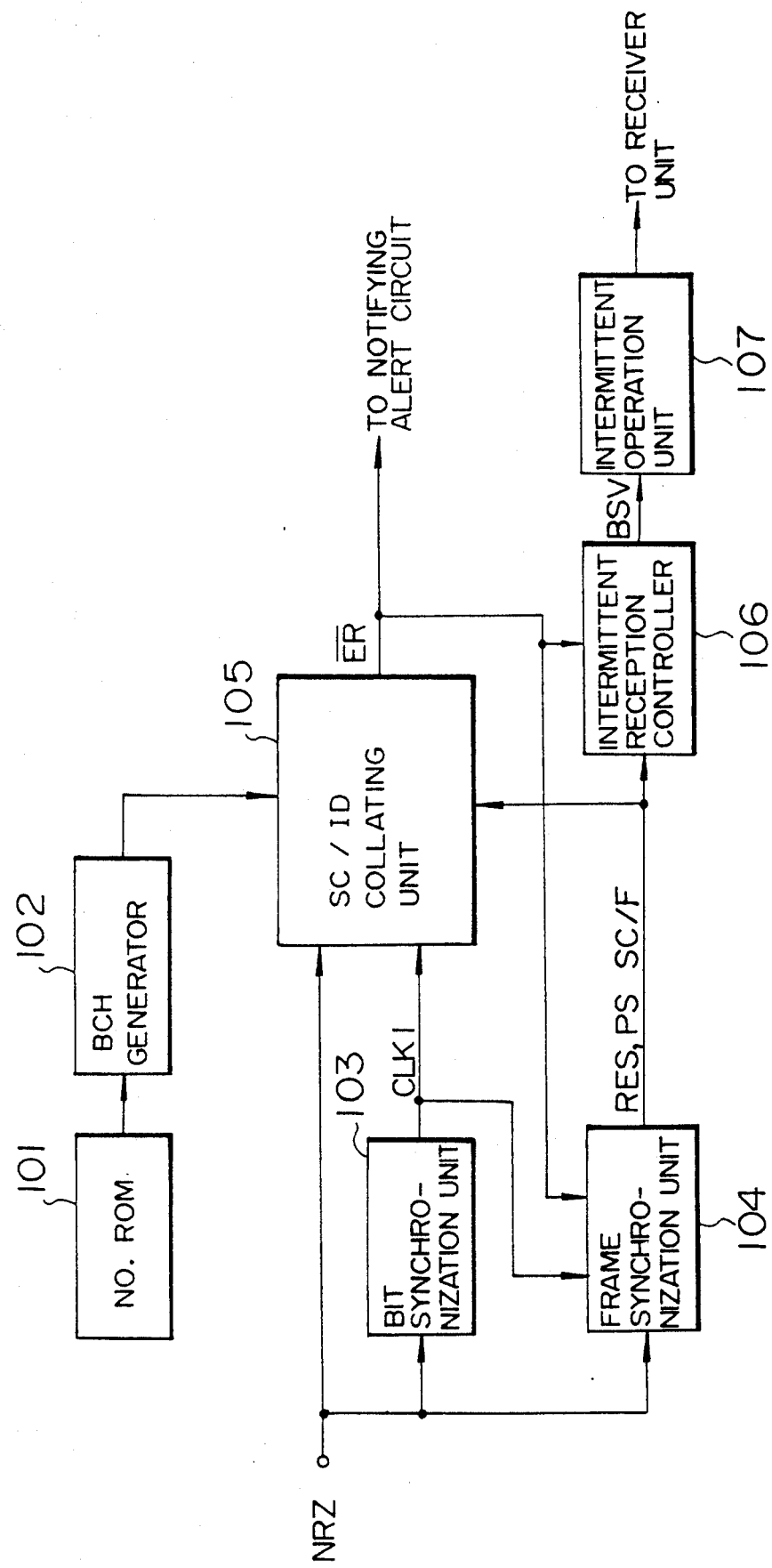
FIG. 5 is a block diagram schematically showing an individual selective call receiving apparatus in an embodiment according to the present invention.

FIG. 5 shows the constitution of an individual selective call receiving apparatus in an embodiment according to the present invention. In FIG. 5, a reference numeral 101 denotes a number ROM for storing therein a selective calling number. A reference numeral 102 designates a BCH generator unit for developing the selective calling number stored in the number ROM 101 into a BCH code.

Moreover, a reference numeral 103 indicates a bit synchronization unit which detects a change point in received (NRZ) data to produce a clock signal CLK1 associated with a transmission speed.

A reference numeral 104 denotes a frame synchronization unit which detects a synchronizing code (SC) signal in the received data to create an intermittent operation signal (PS, RES, SC/F).

A reference numeral 105 designates an SC/ID collating unit functioning as a calling code collating unit a synchronizing code collating unit. In the SC/ID collating unit, the received (NRZ) data is acquired in response to the clock signal CLK1 and is then collated with a fixed pattern of the synchronizing code in a case of a synchronizing code (SC) collation and with data read from the BCH generator 102 in a case of an identifier collation, thereby outputting a result as $\overline{ER}$ to a notifying circuit not shown.

A reference numeral 106 indicates an intermittent reception controller which receives the intermittent operation signal generated from the frame synchronization unit 104 and the output signal $\overline{ER}$ produced from the SC/ID collating apparatus 105 to generate an intermediate operation control signal BSV.

A reference numeral 107 designates an intermittent operation unit for turning the power supplied to a receiver unit (not shown) on and off in association with the intermediate operation control signal BSV created from the intermittent operation unit 107.

Figure 6:
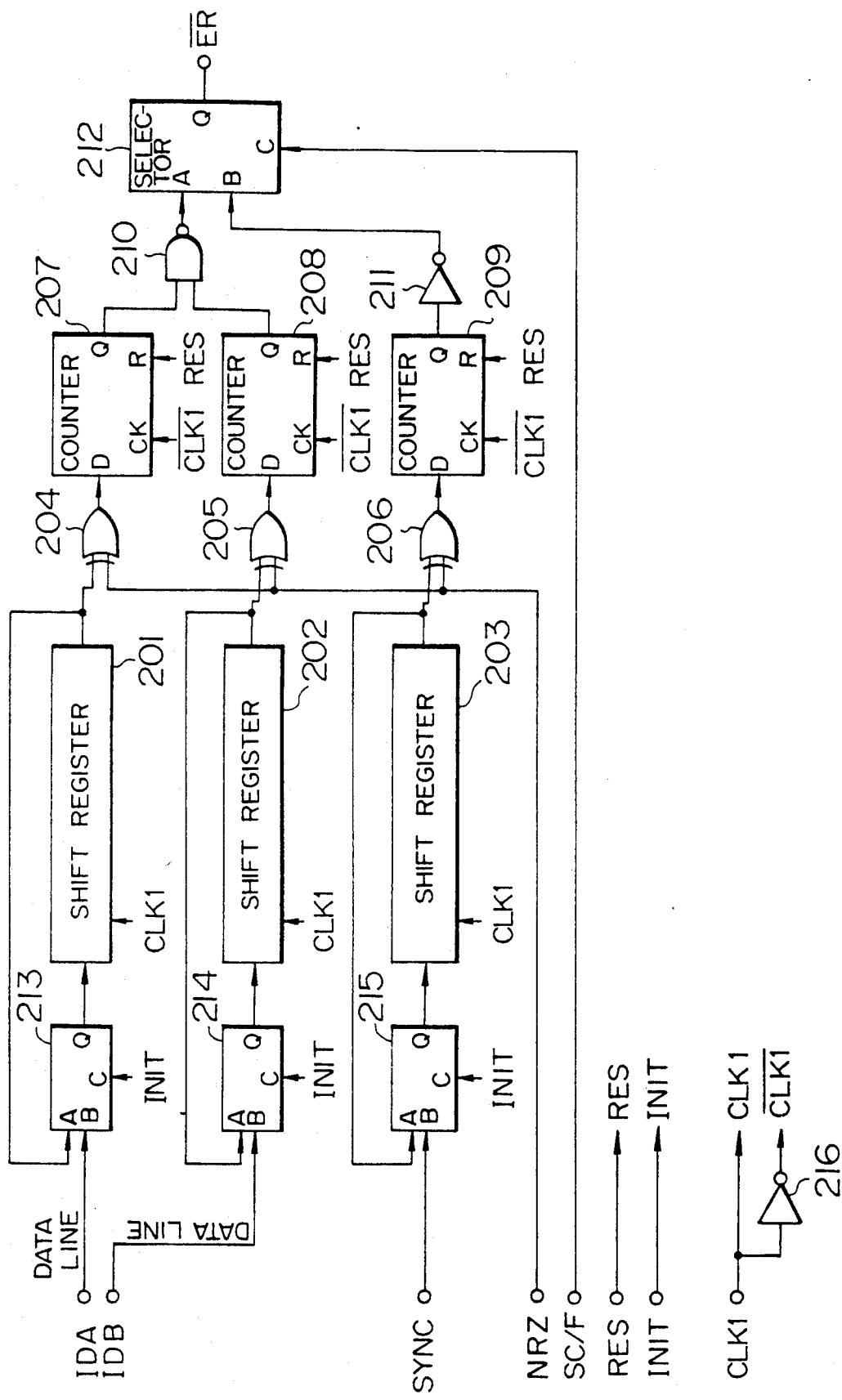
FIG. 6 is a circuit diagram showing the primary sections of a synchronizing code (SC)/identifier (ID) collating apparatus of the embodiment.

FIG. 6 is a detailed block diagram of the SC/ID collating apparatus. In FIG. 6, reference numerals 201 to 203 respectively denote 32-bit registers, which are beforehand loaded with a selective calling code of call A, a selective calling code of call B, and a synchronizing code, respectively.

Each of the shift registers 201 to 203 initiates its operation at a timing of a rising edge of the clock signal CLK1 outputted from the synchronization unit 103 to shift data to the right by one bit.

Reference numerals 204 to 206 denotes exclusive OR gates, which respectively compares the received NRZ data with outputs respectively delivered from the shift registers 201 to 203. Each of these gates 204 to 206 outputs "0" or "1" when the comparison results in a matching or mismatching condition, respectively.

That is, the exclusive OR gates 204, 205, and 206 conduct collating operations of the call A, the call B, and the synchronizing code, respectively.

Reference numerals 207 to 209 respectively denote counters each initiating its operation in response to a rising edge of the clock signal $\overline{CLK1}$ to count the clock signal $\overline{CLK1}$ when the input terminal D is set to "1".

Moreover, when an input R is "1", each of the counters 107 to 109 produces "0" to an output Q regardless of the states of a clock terminal CK and the input terminal D.

In each counter, when the input R is "0", the counting operation is achieved; however, when the count value becomes to be equal to a preset value e.g. "3", an overflow occurs and then "1" is generated to the output terminal Q.

As above, the counters 207 to 209 process the call A, the call B, and the synchronizing code such that each counter counts the number of bits detected to be errors as a result of a collation with the received NRZ data to output "1" to the output terminal Q when the count is three or more, thereby keeping a collation mismatching state.

A reference numeral 210 indicates an NAND gate, which produces an output "1" when each of the outputs produced from the counters 207 and 208 is "1". Namely, when each of the collating operations of the calls A and B results in a collation mismatching, the NAND gate 210 produces the output "0".

A reference numeral 211 denotes an invertor, which outputs "0" when the output from the counter 209 is "1". That is, when a collation mismatching occurs in the synchronizing code collation, the output "0" is generated.

A reference numeral 212 designates a selector, which outputs the state of an input terminal B to an output terminal Q when a control terminal C is set to "1" and outputs the state of an input terminal A to the output terminal Q when the control terminal C is set to "0".

In other words, when the SC/F terminal is set to "1", the SC/ID collating unit 105 accomplishes the synchronizing code collation; whereas, when the SC/F terminal is set to "0", the SC/ID collating unit 105 achieves the identifier collation.

Reference numerals 213 to 215 respectively indicate selectors each outputting the state of an input terminal B to an output terminal Q when a control terminal C is set to "1" so as to output the state of an input terminal A to the output terminal Q when the control terminal C is set to "0".

That is, in a case where data is to be read from the number ROM 101, for example, when the power switch is set to ON, a terminal INIT of each of the selectors 213 to 215 is set to "1" so that data are read from data lines IDA, IDB, and SYNC to be loaded in the shift registers 201, 202, and 203, respectively.

Moreover, in an ordinary reception wait state, these INIT terminals are set to "0" to connect the shift registers 201 to 203 in a ring form so as to conduct the synchronizing code collation and the identifier collation in a repeated manner.

In addition, a reference numeral 216 designates an invertor, which generates an inverted output $\overline{CLK1}$ from the clock signal CLK1 to supply the obtained output signal to the counters 207 to 209.

Subsequently, the operation of the SC/ID collating unit 105 of FIG. 6 will be described by reference to the signal timing chart of FIG. 7. In this timing chart, PS indicates a waveform identical to the conventional intermittent operation waveform and takes a value "1" in ranges respectively related to the synchronization code (SC) and the own frame of the pertinent apparatus.

Furthermore, a preheating period of time of several bits is disposed prior to data to be collated.

Figure 7:
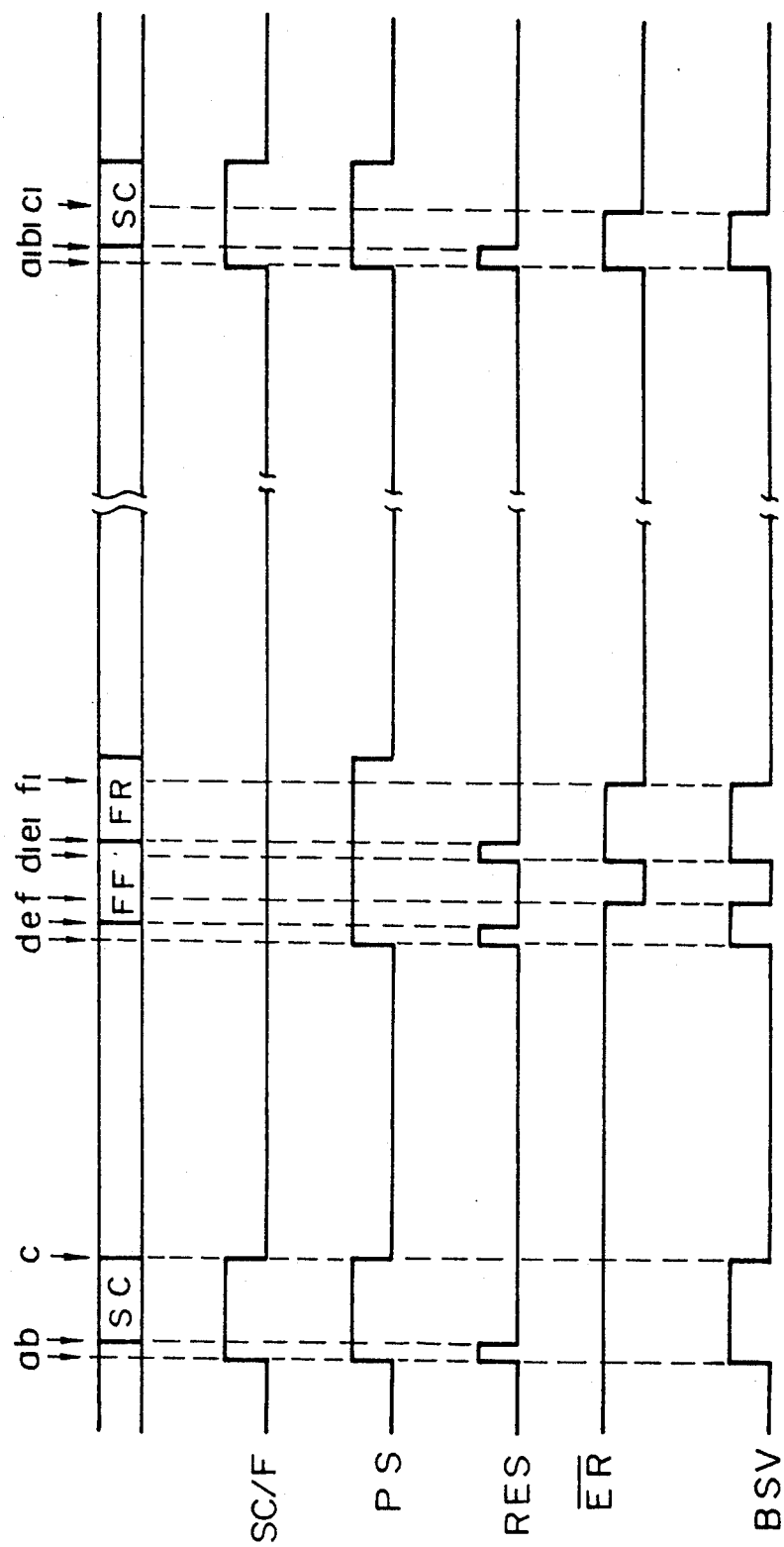
FIG. 7 is a signal timing chart showing the operation of the SC/ID collating apparatus.

In FIG. 7, a waveform RES takes a value "1" for a preheating period of time immediately before the SC word and a first half (FF) portion and a second half (FR) portion of the own frame. A waveform SC/F develops a value "1" at a timing relates to the SC word and the preheating period of time thereof.

In the signal timing chart of FIG. 7, a time zone from a timing chart a to a timing point b is a preheating time. In this interval, the RES (reset) signal is "1" and hence the counters 207 to 209 are reset. At the timing point b, the RES signal is released so that results of collations respectively achieved by the exclusive OR gates 204 to 206 are counted by the counters 207 to 209, respectively.

In this operation, since the SC/F signal is "1" in the zone of the SC word, the output from the NAND gate 210 is invalidated, and therefore the output from the invertor 211 is outputted as ER from the selector 212.

When the 32-bit collation is completely finished in a zone from the timing point b to a timing point c, the operation of the receiver unit is stopped and is kept in the interrupted state up to a timing point d.

A time zone from the timing point d to a timing point e is a preheating time in which the operation is conducted in a manner similar to that of the operation in the time zone a to b.

A collation is then initiated from the timing point e. Since the SC/F signal is "0" in this situation, the signal produced from the NAND gate 210 is outputted as $\overline{ER}$ from the selector 212. Namely, the SC/ID collating unit 105 accomplishes an identifier collation.

In the example of FIG. 7, since an overflow occurs in each of the counters 207 and 208 at a timing point f, the output $\overline{ER}$ from the selector 212 is set to "0". The operation is similarly carried out in the second half portion of the own frame. That is, a time zone from a timing point d1 to a timing point e1 is used as a preheating time; thereafter, at a timing f1, an overflow takes place in each of the counters 207 and 208, and then the selector 12 thereby produces "0" as the output $\overline{ER}$.

The operation related to the time zone a to c also applies to the time zone a1 to c1; however, due to an overflow occurring in the counter 209 at the timing c1, the output $\overline{ER}$ from the selector 212 is changed from "1" to "0".

Figure 8:
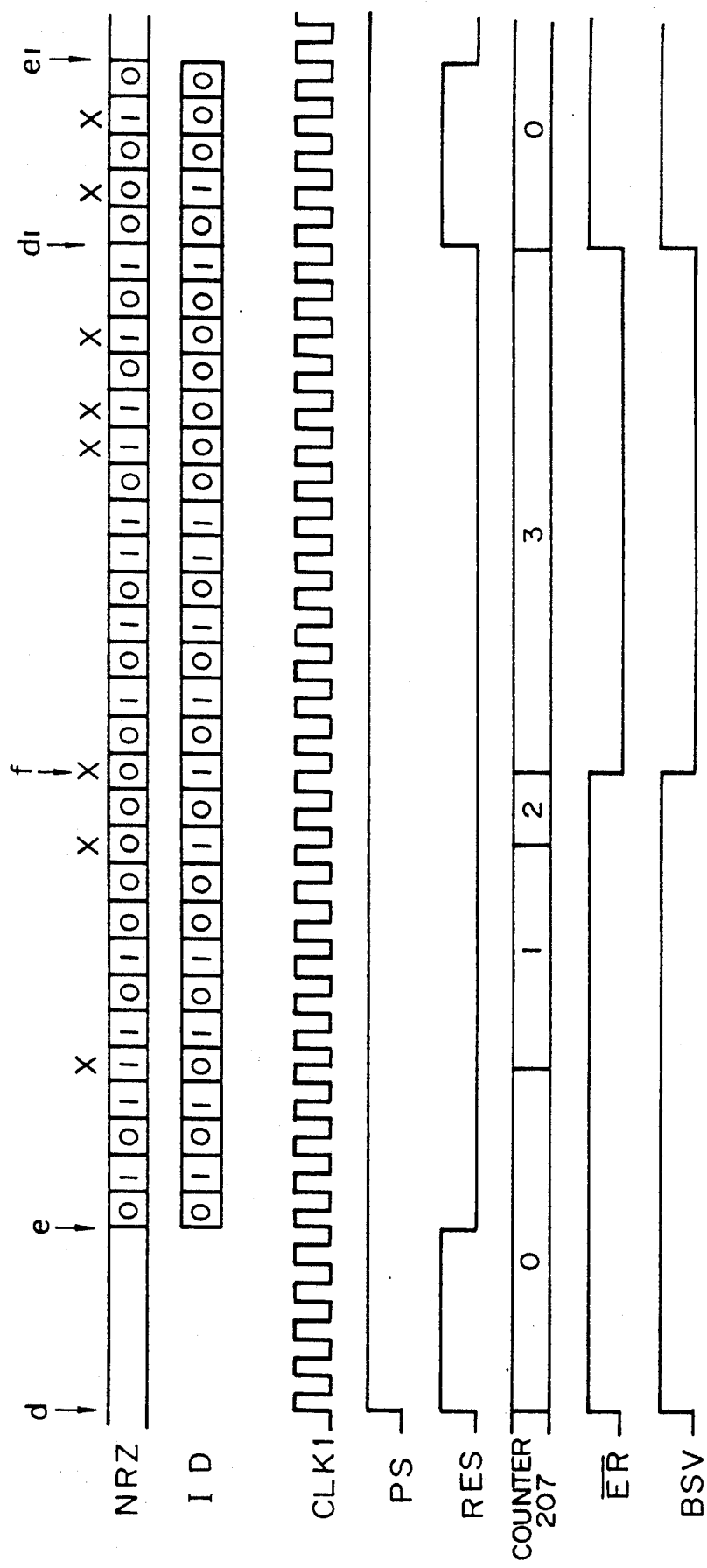
FIG. 8 is a signal timing chart showing the operation of an identifier collation.

Next, referring to FIG. 8, a specific description will be given of states of the respective units when an identifier collation is conducted between the timing points d1 and e1. In the signal timing chart, NRZ denotes received data and ID indicates a selective calling code of the pertinent apparatus.

Furthermore, a bit marked by "x" indicates a position where the collation between the NRZ data and the identifier data results in a mismatching state. In the example of FIG. 8, the collation mismatching has occurred at eight bit positions.

At a timing d, the counter 207 is reset to start the collation at a timing e.

The value of the counter 207 is incremented by one at each position of the mark "x" and becomes to be "3" at a timing f, namely, an overflow occurs. Resultantly, the output ER from the selector 212 is altered from "1" to "0" to notify an identifier collation mismatching.

After this point, although the mismatching mark "x" is found at three positions before a timing d1, the counter 207 is kept remained in the overflow state and hence the count value "3" thereof is also kept unchanged.

When the RES signal is set to "1" at the timing d1, the counter 207 is reset to the count value "0" and then the output ER from the selector 12 is varied from "0" to "1". In a time zone between points d1 and e1, the mismatching mark "x" is indicated at two positions; however, since the RES signal keeps the state of "1", the counter value "0" of the counter 207 is kept retained.

Through the operation above, it is possible to recognize a point of time i.e. a timing f when the number of mismatching bits becomes to be three.

Figure 9:
FIG. 9 is a circuit diagram schematically showing the primary sections of an intermittent operation controller of the embodiment.

Subsequently, referring to FIGS. 7 to 9, the constitution and the operation of the intermittent operation controller 106 will be described. In FIG. 9, a reference numeral 501 designates an OR gate to compute a logical sum between the signals $\overline{ER}$ and PS so as to supply a resultant signal to the intermittent operation unit 107.

This operation will be described by reference to the signal timing chart of FIG. 7. In a state where an overflow data not take place in the counter 209 (the synchronizing code collation), for example, in the time zone a to c, the intermittent operation control signal BSV from is identical to the PS output. In a state where an overflow occurs in the counter 209, for example, in the time zone a1 to c1, the intermittent operation control signal BSV is set to "0" at the occurrence of the overflow (timing c1) and then the receiver unit stops its operation.

As above, according to the embodiment, a logical sum of the output $\overline{ER}$ from the ID/SC collating unit 105 and the output PS from the frame synchronization unit 104 is obtained by the intermittent operation controller 106 in a realtime manner such that the operation of the receiver unit is immediately stopped when an ID/SC collation mismatching takes place, thereby minimizing the power consumed by the apparatus.

In the embodiment above, there ere used only two kinds of selective calling codes for the calls A and B; however, when a necessary number of sets each including a shift register 201, an exclusive OR gate 204, a counter 207, and a selector 213 are added thereto and a multi-input NAND gate is adopted in place of the NAND gate 210, three or more kinds of identifiers can be simultaneously collated through a concurrent operation.

Moreover, in FIG. 5, when data assigned with BCH codes are beforehand stored in the number ROM 101, the BCH generator 102 is unnecessary.

In addition, if the selective calling code is read from the number ROM 101 in a bit-by-bit manner each time an identifier collation is conducted, the shift registers 201 and 202 and the selectors 213 and 214 are also unnecessary, thereby minimizing the circuit size.

Furthermore, in the embodiment above, the collating operation is accomplished in a bit-by-bit manner by use of a clock associated with the data speed of the received code; however, it may also be possible that the 32-bit data is subdivided into n portions (n is an integer ranging from 2 to 32) so that after data including a preset number of bits are obtained, the collation is conducted on the data depending on a clock having a speed higher than that of the clock CLK1. For example, in a case where the collation is achieved through four operations each handling eight bits when the collation is executed, for example, by a micro processor, the processing can be simplified.

According to the present invention, as can be appreciated from the embodiment above, when an identifier collation and/or a synchronizing code collation are/is achieved in a realtime fashion, when a collation mismatching is detected during a data read operation, the intermittent operation controller and the intermittent operation unit are activated to immediately turn the power supplied to the receiver unit off. This resultantly minimizes the operation time of the receiver unit during the frame synchronization and leads to an advantage of the elongation of the battery life.

I claim:

1. An individual selective call receiving apparatus including a receiver unit, comprising:
    an intermittent receiving unit for intermittently operating the receiver unit in association with a group of a calling number assigned to said apparatus;
    collating means for sequentially collating a received synchronizing code sequence with a code sequence of a predetermined synchronizing code pattern, and for sequentially collating a received selective calling code sequence with a code sequence of a predetermined selecting calling code pattern;
    counting means for sequentially counting a number of error bits resultant from each of the collations; and
    an intermittent operation control unit for controlling said intermittent receiving unit when a numeric value counted by said counting means becomes equal to a preset threshold value, thereby turning power of said receiver unit off.

2. An apparatus according to claim 1, wherein each of the predetermined code patterns is beforehand assigned with a BCH code for an error correction.

3. An apparatus according to claim 1, wherein said collating means includes;
    code developing means for developing beforehand the predetermined synchronizing code pattern and the selective calling pattern into respective collating data sequences; and
    memory means for storing the respective developed collating data sequences; and
    wherein said collating means respectively collates the received synchronizing code sequence and the selective calling code with the respective developed collating data sequences bit by bit.

4. An apparatus according to claim 1, wherein said predetermined selective calling code pattern includes a plurality of selective calling codes.

5. An apparatus according to claim 10, wherein said respective developed collating data sequences are respectively assigned with BCH codes.

6. A control method for use with a selective call receiving apparatus having a receiver unit for receiving an individual selective calling code to achieve a selective call operation, collating means and counting means, comprising the steps of:
    conducting with the collating means in a realtime manner a collation between a synchronizing code sequence received by the receiver unit and a code sequence of a predetermined synchronizing code pattern, and a collation between a selective calling code sequence received by the receiver unit and a code sequence of a predetermined selective calling code pattern;
    counting with the counting means a number of error bits resultant from each of the collations by the collating means; and
    controlling, when the count result exceeds a preset threshold value, an intermittent receiving unit disposed to intermittently operate the receiver unit, thereby turning a power of the receiver unit off.

7. A control method according to claim 6, wherein in said step of conducting the collation, the predetermined synchronizing code pattern and the selective calling code pattern are respectively developed beforehand into collating data sequences, and wherein the received synchronizing code sequence and the selective calling code sequence are compared with the respective developed collating data sequences.

8. A control method according to claim 7, wherein the selective calling code pattern includes a plurality of selective calling codes.

9. A control method according to claim 7, wherein in said step of conducting the collation, a plurality of collations are performed with the respective received synchronizing code sequence.

10. A control method according to claim 7, wherein said respective developed collating data sequences are respectively assigned with BCH codes.

11. An individual selective call receiving apparatus which performs a calling operation by receiving a signal which includes a synchronizing signal and an individual calling code, said apparatus comprising:

a receiving unit for receiving the signal including the synchronizing signal and the individual calling code and for demodulating the received signal;

a first memory for storing a predetermined synchronizing signal pattern;

a second memory for storing a predetermined receiver's own calling number;

code developing means for preparing a plurality of collation codes from said receiver's own calling number;

a third memory for storing the collating codes obtained by said code developing means;

synchronizing signal collation means for collating the signal received by said receiving unit with said synchronizing signal pattern bit by bit, for counting mis-collated bits, and for outputting an error signal when a value of the counting exceeds a predetermined number k;

calling number collating means for collating bit by bit the signal received by said receiving unit with the collating code obtained from said code developing means and stored in said third memory, for counting mis-collated bits, and for outputting an error signal when a value of the counting exceeds a predetermined number N; and intermittent receiver control means for cutting off a power supply to said receiver unit immediately when the error signal from said synchronizing signal collating means or said call number collating means is detected.

* * * * *